(12) United States Patent
Brown

(10) Patent No.: US 11,499,536 B2
(45) Date of Patent: Nov. 15, 2022

(54) CYLINDRICAL MAGNETIC COUPLING WITH ALTERNATING POLARITY

(71) Applicant: RENSSELAER POLYTECHNIC INSTITUTE, Troy, NY (US)

(72) Inventor: Ethan Craig Brown, Ravena, NY (US)

(73) Assignee: Rensselaer Polytechnic Institute, Troy, NY (US)

(*) Notice: Subject to any disclaimer, the term of this patent is extended or adjusted under 35 U.S.C. 154(b) by 54 days.

(21) Appl. No.: 16/751,266

(22) Filed: Jan. 24, 2020

(65) Prior Publication Data
US 2020/0240402 A1 Jul. 30, 2020

Related U.S. Application Data

(60) Provisional application No. 62/796,798, filed on Jan. 25, 2019.

(51) Int. Cl.
| | |
|---|---|
| *F04B 35/00* | (2006.01) |
| *H02K 49/10* | (2006.01) |
| *H02K 9/19* | (2006.01) |
| *F04B 53/14* | (2006.01) |
| *F04B 39/00* | (2006.01) |
| *F04B 39/06* | (2006.01) |
| *F04B 37/18* | (2006.01) |

(52) U.S. Cl.
CPC ............ *F04B 35/00* (2013.01); *F04B 37/18* (2013.01); *F04B 39/0005* (2013.01); *F04B 39/064* (2013.01); *F04B 53/14* (2013.01); *H02K 9/19* (2013.01); *H02K 49/106* (2013.01)

(58) Field of Classification Search
CPC .... F04B 35/045; F04B 17/04; F04B 39/0005; F04B 2203/0403; F04B 17/044; F04B 35/00; F04B 37/18; F04B 53/14
See application file for complete search history.

(56) References Cited

U.S. PATENT DOCUMENTS

| | | | | |
|---|---|---|---|---|
| 4,331,277 A | * | 5/1982 | Green | ............... A61B 17/0684 227/130 |
| 4,488,477 A | * | 12/1984 | Miyamoto | ............ F15B 15/086 198/619 |
| 4,526,518 A | * | 7/1985 | Wiernicki | .............. F02M 37/08 417/420 |
| 5,695,471 A | | 12/1997 | Wampler | |
| 6,227,820 B1 | | 5/2001 | Jarvik | |

(Continued)

*Primary Examiner* — Dominick L Plakkoottam
(74) *Attorney, Agent, or Firm* — Murtha Cullina LLP; Anthony P. Gangemi

(57) ABSTRACT

A magnetically coupled piston pump includes a piston, a pump body, and a set of drive magnets. The piston includes a set of piston magnets. Each piston magnet has poles arranged along a longitudinal axis of the piston, and each piston magnet is arranged in the piston so that the orientation of the poles of each piston magnet is the opposite of the orientation of each adjacent piston magnet. The piston is disposed in and permitted to move within the pump body. The set of drive magnets is arranged outside the pump body. Each drive magnet corresponds to a piston magnet, has poles arranged along the longitudinal axis, and is arranged so that the orientation of the poles is opposite the orientation of the poles of the corresponding piston magnet. A drive unit is coupled to the drive magnets for moving the drive magnets along the longitudinal axis.

18 Claims, 18 Drawing Sheets

(56) References Cited

U.S. PATENT DOCUMENTS

| | | |
|---|---|---|
| 6,234,772 B1 | 5/2001 | Wampler et al. |
| 6,326,706 B1 * | 12/2001 | Zhang .................. F04B 35/045 |
| | | 310/12.32 |
| 6,447,266 B2 | 9/2002 | Antaki et al. |
| 6,688,861 B2 | 2/2004 | Wampler |
| 7,288,085 B2 | 10/2007 | Olsen |
| 7,695,253 B2 * | 4/2010 | Yang ........................ F04B 9/00 |
| | | 417/322 |
| 8,643,228 B2 * | 2/2014 | Vogel .................. H02K 41/031 |
| | | 310/12.24 |
| 9,695,806 B2 * | 7/2017 | Van Brunt ........ A61M 16/0057 |
| 9,746,211 B2 * | 8/2017 | Barclay .................. F25J 1/0276 |
| 9,906,113 B2 * | 2/2018 | Iwaki ..................... H02K 33/16 |
| 2002/0159233 A1 * | 10/2002 | Patel .................. H05K 7/20727 |
| | | 361/702 |
| 2007/0212237 A1 | 9/2007 | Zhao |
| 2008/0115664 A1 * | 5/2008 | Minowa ................ F15B 15/086 |
| | | 92/169.1 |
| 2009/0191073 A1 * | 7/2009 | Kopecek ............... F04B 17/044 |
| | | 417/415 |
| 2010/0277012 A1 * | 11/2010 | Kobayashi .............. F02B 63/04 |
| | | 310/30 |
| 2011/0020156 A1 * | 1/2011 | Van Brunt ............. F04B 17/04 |
| | | 417/416 |
| 2012/0112570 A1 * | 5/2012 | Le Besnerais ........... H02K 9/19 |
| | | 310/54 |
| 2014/0147305 A1 | 5/2014 | Johansson |
| 2016/0252081 A1 * | 9/2016 | Jones ...................... F04B 19/22 |
| | | 417/406 |
| 2017/0328603 A1 * | 11/2017 | Barclay ................... F25J 1/001 |
| 2018/0023551 A1 | 1/2018 | Van Brunt et al. |
| 2018/0038363 A1 | 2/2018 | Trethewey |
| 2019/0160443 A1 * | 5/2019 | Cauley, III ............. C12M 47/06 |

* cited by examiner

FIG. 9A
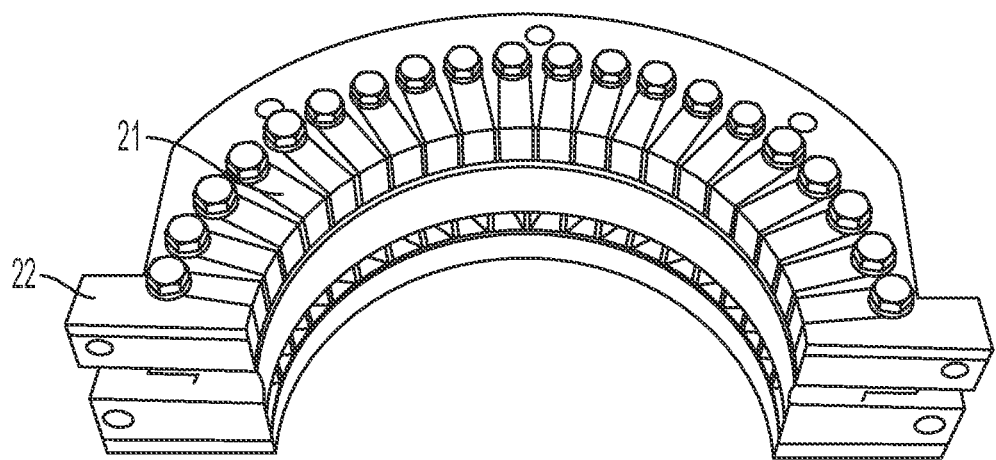
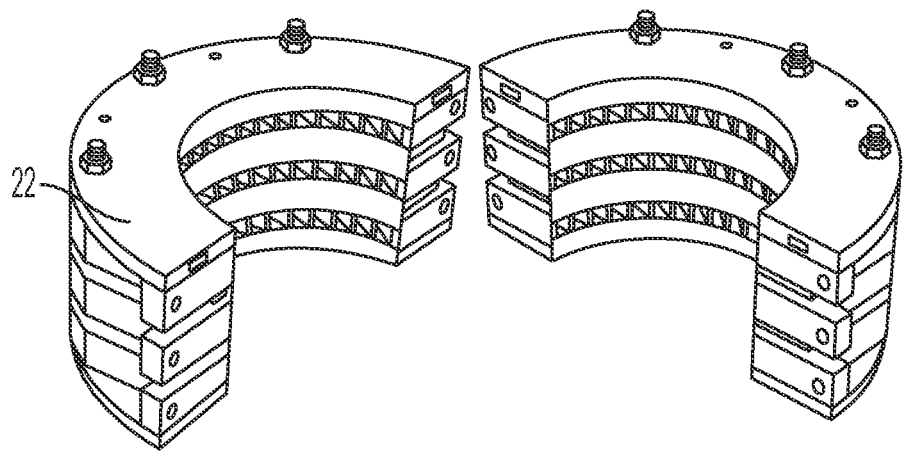
FIG. 9B

CYLINDRICAL MAGNETIC COUPLING WITH ALTERNATING POLARITY

CROSS REFERENCE TO RELATED APPLICATION(S)

This application claims the benefit of U.S. Provisional Patent Application No. 62/796,798, filed Jan. 25, 2019, which is incorporated by reference as if disclosed herein in its entirety.

STATEMENT REGARDING FEDERALLY SPONSORED RESEARCH OR DEVELOPMENT

This invention was made with government support under grant #1719259 awarded by the National Science Foundation. The government has certain rights in the invention.

FIELD OF THE INVENTION

The present invention relates to the field of piston pumps, and more specifically, to piston pumps employing cylindrical, magnetically-coupled drive mechanisms.

BACKGROUND

Experiments based on noble elements such as gaseous or liquid argon or xenon utilize the ionization and scintillation properties of the target materials to detect radiation-induced recoils. A requirement for high light and charge yields is to reduce electronegative impurities well below the ppb[1] level. To achieve this, the target material is continuously circulated in the gas phase through a purifier and returned to the detector. Additionally, the low backgrounds necessary dictate low-Rn-emanation rates from all components that contact the gas.

Detectors based on noble elements have become widespread in many applications such as Compton telescopes, ionization calorimeters, neutrino-less double-beta-decay searches, and direct dark matter detection experiments. Radiation-induced recoils in the detector medium produce scintillation and ionization signals that are read out by photosensors or charge sensors. As these detectors become larger, the propagation of the light and charge must improve to reach the required threshold and energy resolution, necessitating an increased demand on gas-purifying systems. Similarly, backgrounds from radioactive impurities like Rn must be minimized to reach high sensitivity to rare events.

The operational specifications are dominated by the need to drift electrons over lengths 1 m and greater. Electronegative elements like $O_2$ and $H_2O$ are continually introduced to the detector material by out-gassing of detector components. As these, and other electronegative impurities, impede charge and light propagation, they are continuously removed, usually by pumping the detector material in the gaseous phase through a heated metal getter, then returning it to the detector. In the case of XENON1T, an $O_2$ equivalent concentration in the xenon below 1 ppb is required to drift charge over a 1 m scale without appreciable electron attenuation via attachment to impurities.

The other aspect of detector purity involves Rn mitigation, which is predominantly handled by careful selection of materials with low Rn-emanation rates. The gas handling and purification systems, including the pumps, are a key contributor to the internal Rn background. Incorporating radiopurity screening in a collaborative effort with pump manufacturers provides some level of success, reaching Rn emanation rates of a few mBq, but further Rn reduction by an order of magnitude is still needed.

At the same time, since detectors become larger, the requirements on pumps increase in kind. Larger detectors need a higher purity to reach the same level of charge attenuation. This is coupled with the fact that there is more material to clean, which necessitates a pump with significantly improved performance to allow high throughput at a pressure differential greater than 1 bar.

SUMMARY

Since commercial pumps often introduce electronegative impurities from lubricants on internal components or through small air leaks, and are not designed to meet the radiopurity requirements, custom-built pumps are an advantageous alternative. The present technology is directed to a new pump developed based on a magnetically-coupled piston. In some embodiments, it is used in a hermetically sealed low-Rn-emanating vessel and delivers high performance for noble gases, reaching more than 210 standard liters per minute (slpm) with argon and more than 170 slpm with xenon while maintaining a compression of up to 1.9 bar. Embodiments of the present technology demonstrating its capability for noble gas detectors and other applications requiring high standards of gas purity.

Accordingly, objects of the present technology include a pump that features a larger effective volume in combination with an enhanced magnetic gradient based on alternating polarity to allow O(kN) coupling forces between internal and exterior magnets. In some embodiments, such a pump reaches flow rates at O(100) slpm at a pressure differential up to 2 bar. Some embodiments have potential application in the XENON dark matter project and the nEXO neutrino-less double-beta-decay experiment. In one embodiment, the pump body has a length of 520 mm and an inner diameter of 127 mm.

According to another embodiment of the present technology, a magnetically coupled piston pump including a piston, a pump body, and a set of drive magnets is provided. The piston includes a set of piston magnets. Each piston magnet has poles arranged along a longitudinal axis of the piston and each piston magnet is arranged in the piston so that the orientation of the poles of each piston magnet is the opposite of the orientation of each adjacent piston magnet. The piston is disposed in and is permitted to move within the pump body. The set of drive magnets is arranged outside the pump body. Each drive magnet corresponds to a piston magnet and each drive magnet has poles arranged along the longitudinal axis. Each drive magnet is arranged so that the orientation of the poles is opposite the orientation of the poles of the piston magnet to which it corresponds.

In some embodiments, the pump further includes a drive unit coupled to the drive magnets for moving the drive magnets along the longitudinal axis.

In some embodiments, the pump further includes a first flange attached to a first end of the pump body, and a second flange attached to the second end of the pump body. The first and second flanges each have inlet and outlet ports that permit fluid to enter and exit the pump body. In some embodiments, the fluid is argon gas. In other embodiments, the fluid is xenon gas.

In some embodiments, the pump further includes a cooling system for regulating the temperature within the pump.

In some embodiments, the set of piston magnets includes at least two permanent magnets, and the set of drive magnets includes at least two permanent magnets. In other embodiments, the set of piston magnets and the set of drive magnets each include three permanent magnets.

In some embodiments, the piston and drive magnets are ring magnets.

In some embodiments, each drive magnet of the set of drive magnets includes a plurality of bar magnets attached to a frame and arranged in a cylindrical configuration.

In some embodiments, the pump body is hermetically sealed and the piston is sealed against an interior wall of the pump body with a plurality of gaskets formed of ultra-high molecular weight polyethylene.

In some embodiments, the piston magnets and the drive magnets are configured to have a coupling strength of about 790N to about 3500N. In other embodiments, the piston magnets and the drive magnets are configured to have a coupling strength of about 3500N.

In some embodiments, adjacent magnets of the set of piston magnets and the set of drive magnets are evenly spaced along the longitudinal axis. In other embodiments, the set of piston magnets and the set of drive magnets have about 100 mm spacing between adjacent magnets along the longitudinal axis.

In some embodiments, the pump further includes a gap of about 8.5 mm transverse to the longitudinal axis between the set of piston magnets and the set of drive magnets.

According to yet another embodiment of the present technology, a magnetically coupled drive mechanism including a piston, at least three drive magnets arranged outside the piston, and a drive unit is provided. The piston includes at least three piston magnets. Each piston magnet has poles arranged along a longitudinal axis of the piston, and each piston magnet is arranged in the piston so that the orientation of the poles of each piston magnet is the opposite of the orientation of each adjacent piston magnet. Each drive magnet corresponds to a piston magnet. Each drive magnet has poles arranged along the longitudinal axis, and each drive magnet is arranged so that the orientation of the poles is opposite the orientation of the poles of the corresponding piston magnet. The drive unit is coupled to the drive magnets for moving the drive magnets along the longitudinal axis.

In some embodiments, the piston and drive magnets are ring magnets. In other embodiments, each of the drive magnets includes a plurality of bar magnets attached to a frame and arranged in a cylindrical configuration.

In some embodiments, the piston is configured to be disposed in and permitted to move within a cylindrical pump body, and the drive unit and drive magnets are arranged outside the cylindrical pump body.

Further objects and features of the present technology will be apparent from the below description and attached drawing figures.

BRIEF DESCRIPTION OF THE DRAWINGS

FIG. 9a is an isometric view of a sequence of bar magnets forming a portion of the outer magnetic ring according to an embodiment of the present technology.

FIG. 9b is an isometric view of two halves of the complete outer magnetic ring of FIG. 9a.

DETAILED DESCRIPTION

As used herein when describing a measureable numerical value, the term "about" includes the specific numerical value and a reasonable range encompassing the specific numerical value to account for, e.g., errors inherent in the measuring equipment used and in the humans handling such equipment. The reasonable range can be ±5%, or even ±10% of the specific numerical value. Thus, for example, a recitation of "about 100N" could reasonably include the range of 90-110N without departing from the spirit and scope of the present technology.

To drive a piston using coupling of permanent magnets, some embodiments of the present technology include an optimized magnet configuration. In some embodiments, the pressure specifications on this pump are around a factor of 2 higher than those of previously designed pumps, such as the EXO-200 pump. This, combined with the flow increase, requires improved magnetic coupling.

Figure 1:
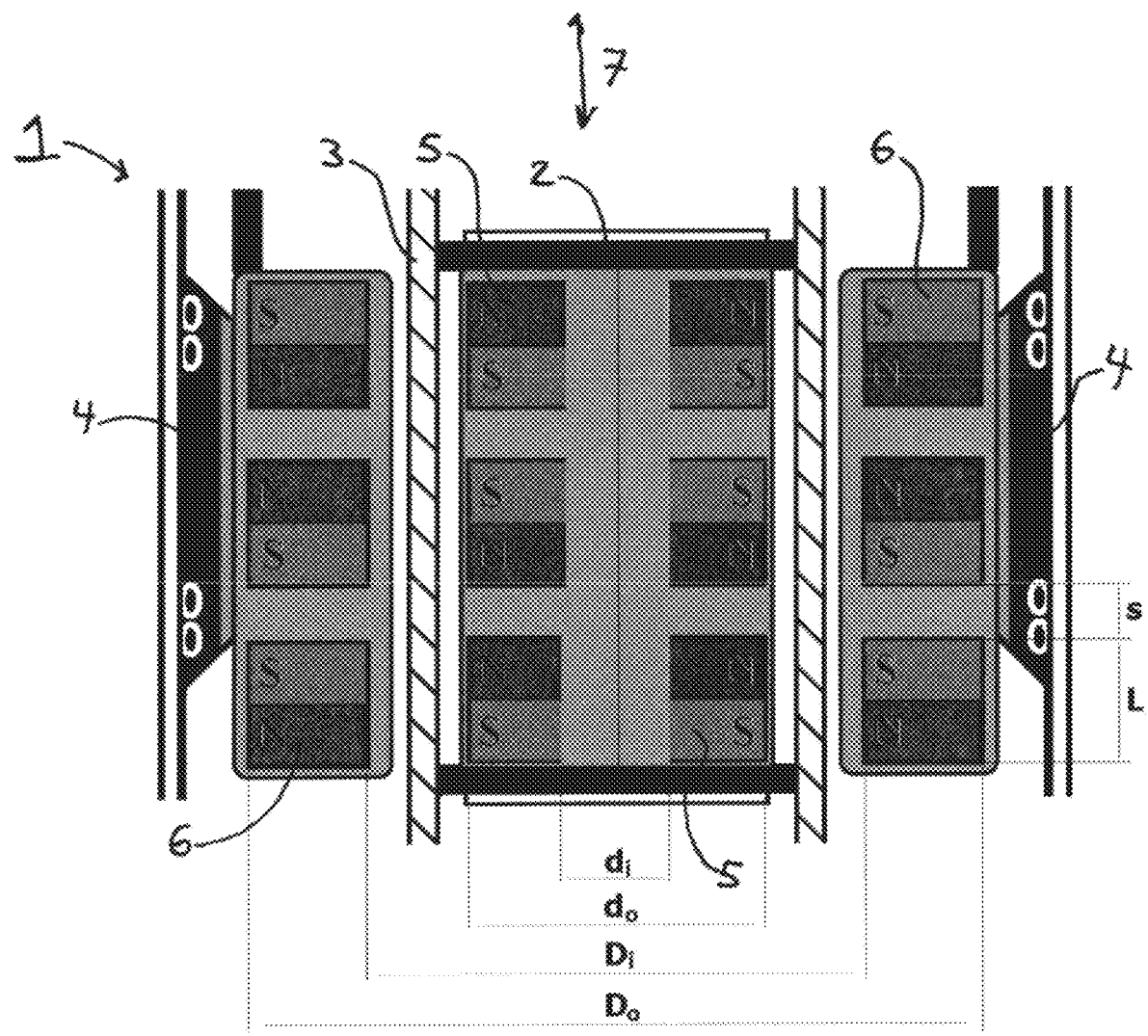
FIG. 1 is a cross-sectional view of the piston and drive unit magnet arrangements of a pump according to a first embodiment of the present technology.

FIG. 1 shows a cross-sectional view of the magnet arrangement of pump 1 according to a first embodiment of the present invention. Pump 1 has piston 2 located within pump body 3, and drive unit 4 located outside pump body 3. Piston 2 includes a set of piston magnets 5, and drive unit 4 includes a set of drive magnets 6. Preferably, the piston magnets 5 and drive magnets 6 are each stacked along the longitudinal axis 7 of the pump body 3. In some embodiments, the piston magnets 5 and the drive magnets 6 are ring magnets with the inner and outer diameters of the piston magnets 5 denoted by $d_i$ and $d_o$, respectively, and the inner and outer diameters of the drive magnets 6 denoted by $D_i$ and $D_o$, respectively. The length of magnets 5/6 is denoted by L, and the distance between adjacent magnets along the longitudinal axis 7 of the pump body 3 is denoted by s. In some embodiments, each of the piston magnets 5 and drive magnets 6 are permanent magnets.

The embodiment shown in FIG. 1 uses an alternating orientation of longitudinal magnetization in the stack of magnets 5/6 along the longitudinal axis 7 of the pump body 3. The piston magnets 5 are on the longitudinal axis 7, and are preferably formed of multiple ring magnets with magnetization along the longitudinal axis 7 that alternate N-S, S-N, etc., such that the same poles are pointed together for adjacent magnets. The drive magnets 6 are arranged with opposite magnetization direction to that of the piston magnets 5 to form a closed flux loop around each piston magnet 5. The drive magnets 6 also have like poles pointed together for adjacent magnets. When the piston magnets 5 are each centered within their corresponding drive magnet 6, the piston 2 is in equilibrium. Upon displacement, there is a restoring force between concentric pairs, and there is an additional cross-coupling from the adjacent drive magnets 6, which, in this embodiment, increases the coupling strength non-linearly with the number of magnet pairs. In this embodiment, the cross coupling is important for improved performance of the pump 1.

Figure 2:
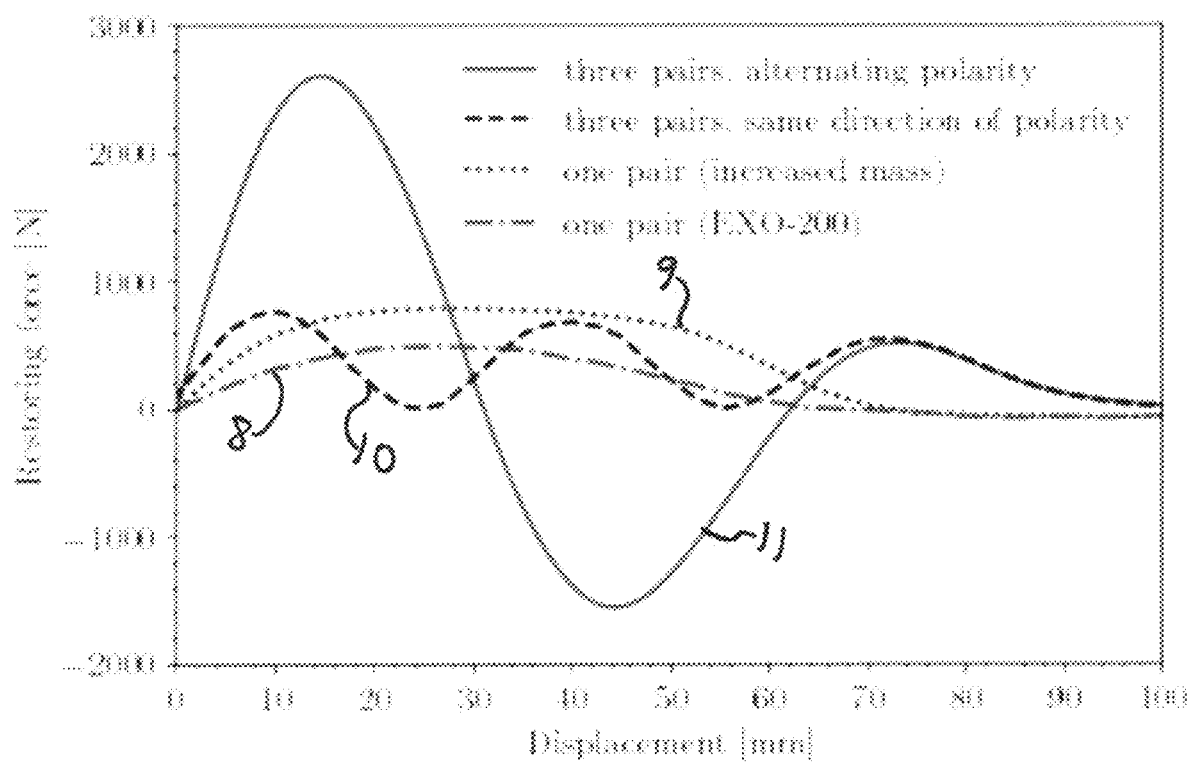
FIG. 2 is a chart showing the restoring force as a function of piston displacement for embodiments having different magnet configurations.

FIG. 2 shows the restoring forces for magnet configurations according to various embodiments. The configuration for the EXO-200 pump is shown in dash-dotted curve 8. Here, the piston magnet 5 is a single solid cylinder ($d_i$=0 mm, $d_o$=25.4 mm, B=1.48 T) while the drive magnet 6 featured diameters of $D_i$=45 mm and $D_o$=76 mm with a field strength of 1.32 T. The magnet lengths were L=51 mm. A maximum coupling strength of 490N was achieved.

FIG. 2 also includes restoring forces for embodiments with an increased magnet mass. In some embodiments, the piston magnet 5 was a ring magnet ($d_i$=80 mm, $d_o$=120 mm, B=1.32 T) to match realistic designs based on availability commercial products. The drive ring magnet 6 measured $D_i$=137 mm and $D_o$=147 mm with a field strength of 1.38 T. The dotted curve 9 shows a single magnet pair with a length of L=60 mm. In spite of the weaker field strength of the piston magnet 5, there is a stronger coupling force of 790N, due to the increased magnet mass. The remaining curves in FIG. 2 show embodiments having the same magnet dimensions as for the dotted curve 9 embodiment, but with the length divided into three equal segments measuring 20 mm. By spacing the three segments a distance s=10 mm apart, and orienting the magnets with the same polarity of magnetization, the dashed curve 10 is obtained. The gain in coupling strength is negligible, but three equilibrium points can be observed. This is the consequence of having three magnet pairs that allow a displacement of one ring magnet in the piston 2 with respect to each of the three drive magnet rings 6. Using the same magnet placement, but utilizing a magnet configuration according to an embodiment of the present technology, yields the solid curve 11 in FIG. 2. This configuration gives an additional boost of the coupling strength up to 2600N, a factor 3:3 higher than the maximum coupling of the EXO-200 pump.

In some embodiments, a variety of magnet configurations and the corresponding coupling forces were compared. Based on the availability of commercial magnets, several parameters were fixed and used as constraints in the simulations. The piston magnets 5 considered had a field strength of 1.32 T and were solid cylinders with a diameter of $d_o$=120 mm. The drive ring magnets 6 had the same field strength of 1.32 T and had inner and outer diameters that ranged from 130 mm to 200 mm. The length of the magnet pairs L and the spacings s along the longitudinal axis 7 of the pump body 3 between adjacent magnet pairs were varied, as was the number of magnet pairs used.

Figure 3:
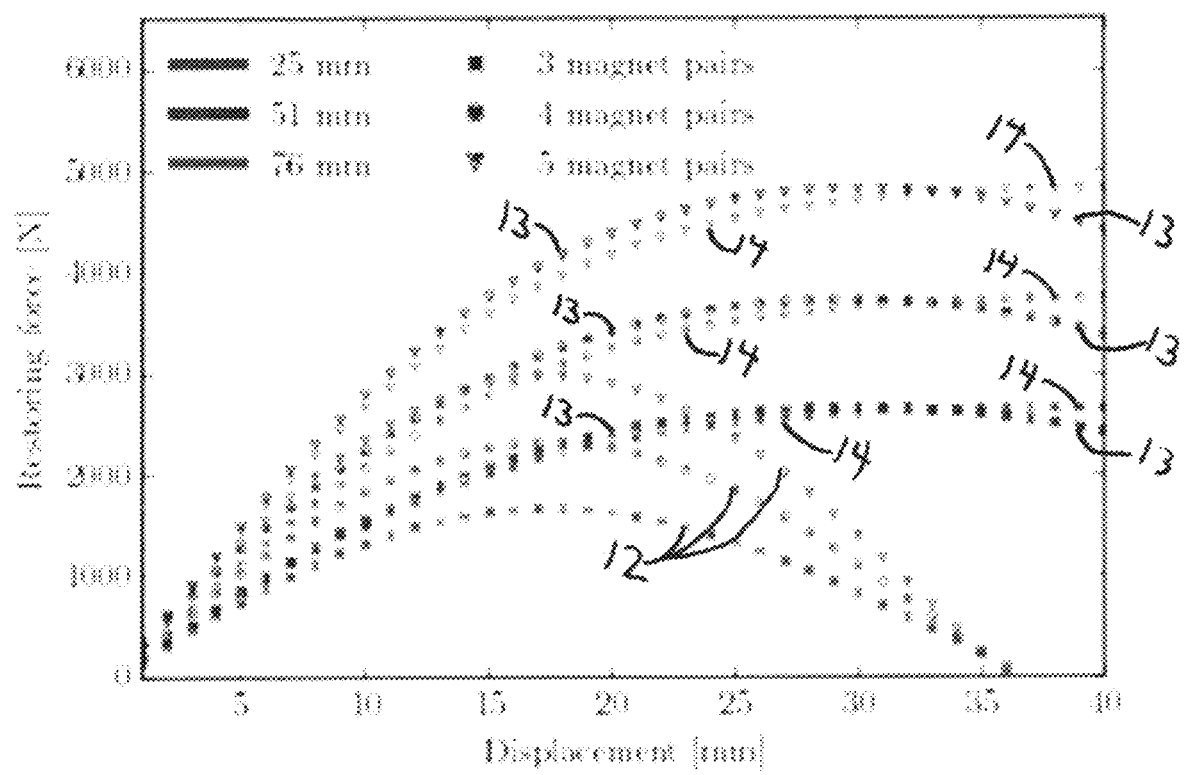
FIG. 3 is a chart showing the coupling force as a function of piston displacement for embodiments having different magnet lengths and numbers of magnet pairs.

In some embodiments, the variation of the number and length of the magnets was performed simultaneously to directly compare the difference between the same magnet mass in different arrangements. For example, two magnet pairs of a given length have the same mass as four magnet pairs that are half as long. In these embodiments, magnet lengths L of 25 mm, 51 mm, and 76 mm were considered (labeled 12, 13, and 14, respectively), with the number of magnet pairs ranging from three to five and an inter-magnet spacing of s=10 mm. The drive magnets 6 used in these simulations had an inner diameter of $D_i$=140 mm and an outer diameter of $D_o$=200 mm. The resulting coupling force for several exemplary embodiments is shown as a function of piston displacement in FIG. 3. The results shown in FIG. 3 reveal several trends. First, there is little distinction between the 51 mm and 76 mm magnets for the same number of magnet pairs, indicating that the longer magnets become ineffective at increasing the coupling. Additionally, there is a clear increase in coupling strength with increasing numbers of magnets. Another important feature shown in FIG. 3 is the increase in coupling force due to the cross coupling of adjacent magnet pairs. This is evident when comparing the peak restoring force for different magnet masses. For example, the curve for five 25 mm magnets peaks at a higher force than the curve for three 51 mm magnets, in spite of the fact that it has less magnet mass. Finally, these results demonstrate the feasibility of reaching O(kN) forces with a modest number of magnets in some embodiments.

Figure 4:
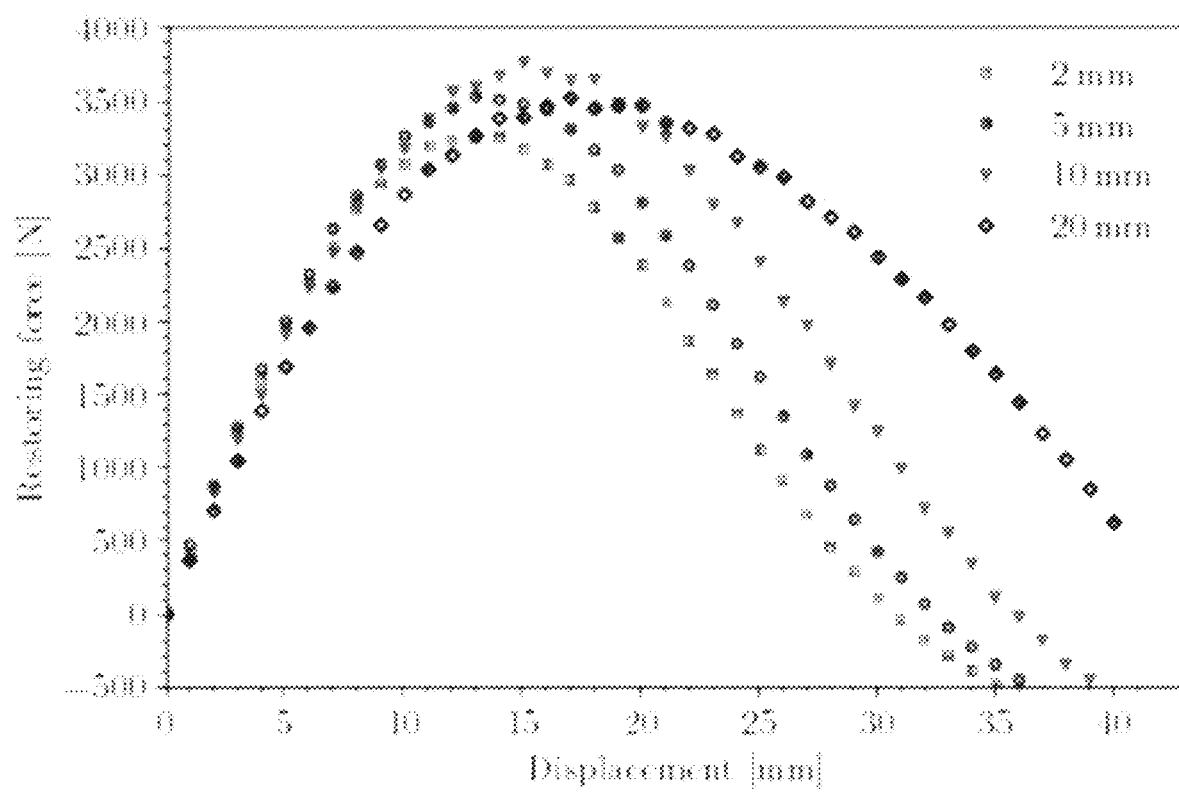
FIG. 4 is a chart showing the coupling force as a function of piston displacement for embodiments having different spacing distances between magnet pairs.

In some embodiments, the spacing s along the longitudinal axis 7 between adjacent magnet pairs was analyzed. In these embodiments, two magnet pairs were used with piston magnets 5 measuring L=20 mm in length and drive magnets 6 having an inner diameter $D_i$=140 mm and an outer diameter $D_o$=200 mm. The spacing s was then varied from 2 mm to 20 mm. As shown in FIG. 4, there is a peak in the restoring force at 10 mm spacing, indicating that this is the optimal spacing. The same optimal 10 mm spacing was seen for other magnets lengths, suggesting that the optimal spacing is related to the fixed diameter of the piston magnets 5. Thus, preferred embodiments of the present technology have a spacings of about 10 mm between adjacent magnets.

Figure 5:
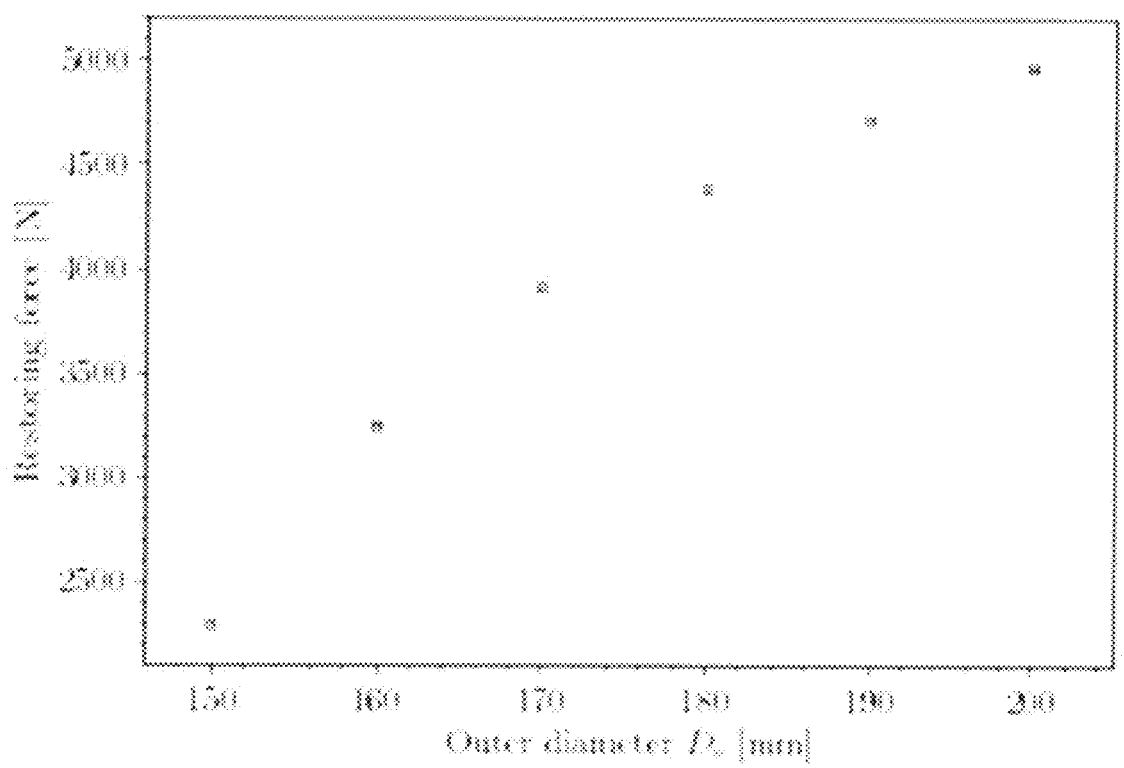
FIG. 5 is a chart showing the maximum coupling for drive magnets with an inner diameter of 140 mm and varying outer diameters.

In some embodiments, the optimal inner and outer diameters were determined by experimenting on the size of the drive magnets 6. For determining the optimal outer diameter, the inner diameter was fixed at $D_i$=140 mm, and the outer diameter $D_o$ was varied from 150 mm to 200 mm. As shown in FIG. 5, there is a modest increase by about a factor of two at the extremes. But this should be compared to the change in magnet mass, which increases by a factor of seven. There is also a slight flattening in the slope when $D_o$ is around 180 mm, indicating magnets larger than this only add minimally to the coupling strength.

Figure 6:
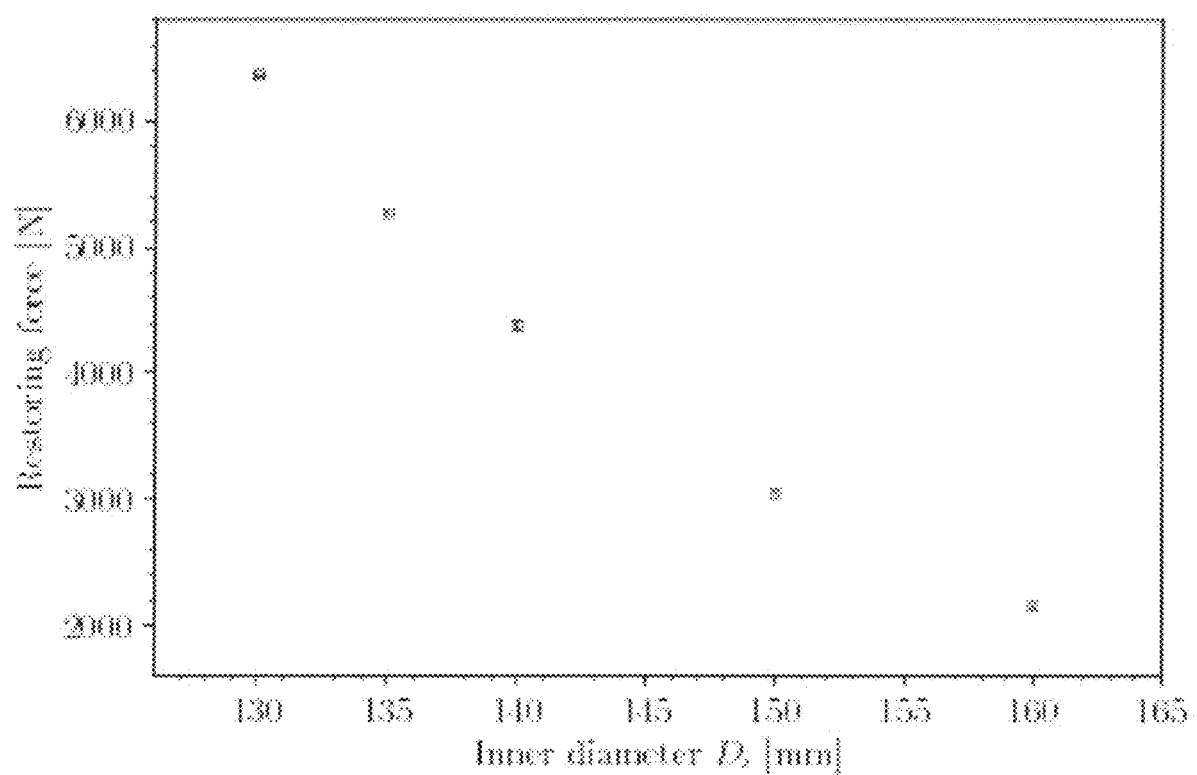
FIG. 6 is a chart showing the maximum coupling for different inner diameters of the drive magnets.
Figure 7:
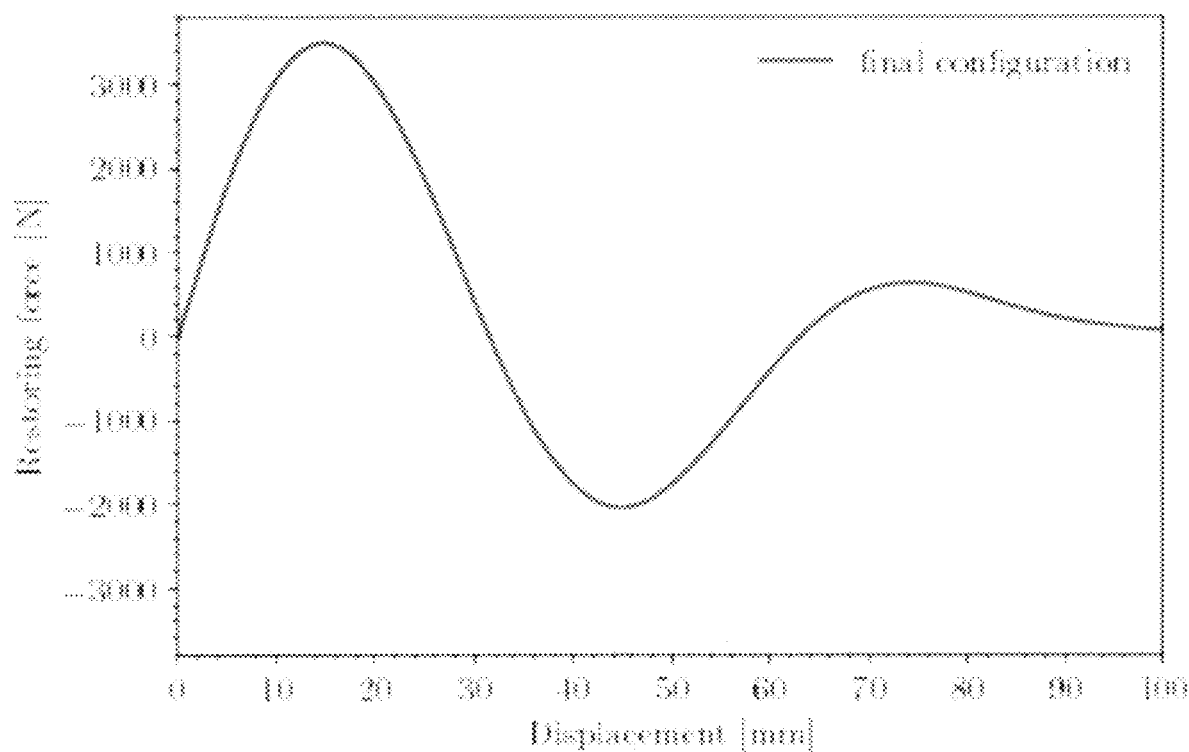
FIG. 7 is a chart showing the restoring force as a function of ring displacement of a pump according to another embodiment of the present technology.

For determining the optimal inner diameter $D_i$, the thickness of the drive magnet 6 was fixed at 20 mm. All other parameters were fixed to the same values as for the outer diameter experiments, and the inner diameter $D_i$ was varied from 130 mm to 160 mm. FIG. 6 shows the maximum coupling, which has a steeper slope than that of the outer diameter $D_o$. This is because the magnetic field varies most strongly close to the piston magnets 5, so to achieve the strongest coupling the drive magnets 6 should be placed as close as possible to the piston 2. The optimal features discussed herein are used in preferred embodiments of pump 1. By using multiple, short magnets with optimized spacing and geometry, a significant increase in coupling strength is achieved relative to the EXO-200 pump. In preferred embodiments, the piston 2 has three ring magnets 5 measuring $d_i$=80 mm, $d_o$=120 mm, and L=20 mm, and with a field strength B=1.32 T. The piston magnets 5 are arranged with the alternating polarity design discussed above with a distance between each ring of s=10 mm. The drive unit 4 contains three matching ring magnets 6 with the same linear dimensions and diameters of $D_i$=137 mm, $D_o$=157 mm, and a field strength of B=1:38T. FIG. 7 shows the predicted coupling force for this configuration as a function of displacement of the piston 2 relative to the drive magnets 6. This embodiment yields a maximum coupling force of about 3500N, a factor of seven larger than the initial EXO-200 design as presented in FIG. 2. This coupling strength is sufficient to provide a pressure differential of up to 2 bar with a large aperture pump volume.

Figure 8A:
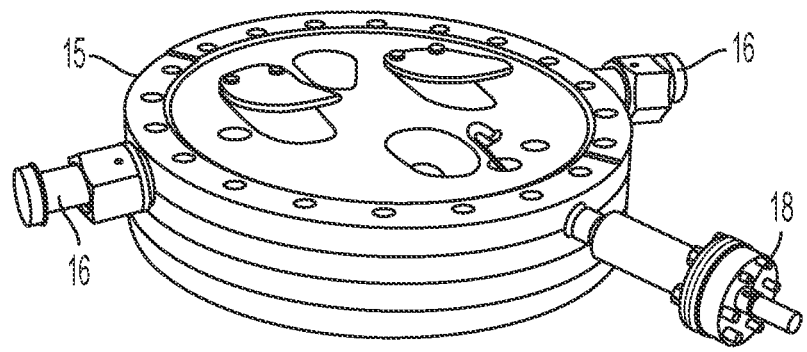
FIG. 8a is an isometric view of an end flange of the pump according to an embodiment of the present technology.

FIGS. 8a-11 show various features of the pump 1 according to some embodiments. In some embodiments, the pump 1 is formed of a monolithic type 316L stainless-steel (SS) body 3 having a length of 520 mm, an inner diameter of 127 mm, and an outer diameter of 133 mm, giving a total volume of 4.5 L. The interior wall of pump body 3 is preferably honed to create a low-friction surface. The pump body 3 has first and second ends (preferably, top and bottom ends). In some embodiments, each end of pump body 3 is closed with custom ConFlat stainless steel flanges 15. As shown in FIG. 8a, flange 15 allows fluid to enter and exit the pump body 3 through inlet/outlet ports 16, and provides a vacuum port for cleaning. Preferably, the ports are sealed with copper gaskets to maintain high leak-tightness. The inlet/outlet ports 16 are formed of electropolished stainless steel tubes with VCR connections that use metal gasket seals. These are welded directly to the custom ConFlat flanges 15 on either end of the pump 1. Preferably, there are three ports on each flange 15 to serve as an inlet and outlet by use of flapper valves 17 (see FIG. 12), and an open line to serve as an unimpeded port for pumping vacuum on the pump 1 to clean it before use and to measure the pressure inside the pump 1. Flapper valves 17 constructed from sub-millimeter spring-steel foils maintain unidirectional flow. These are supported with a stainless steel grid on one side to prevent the flapper valves 17 from popping into the vent port and with a stainless steel plate on the other side to prevent excess bending that could damage the flapper valves 17. The flapper valves allow both ends of the pump to alternatively supply compression at the fluid discharge and expansion to draw in low pressure fluid. Additionally, the top flange contains a PT1000 temperature sensor 18 wired with vacuum compatible PTFE coated cable and connected to a ceramic CF16 feedthrough.

Figure 8B:
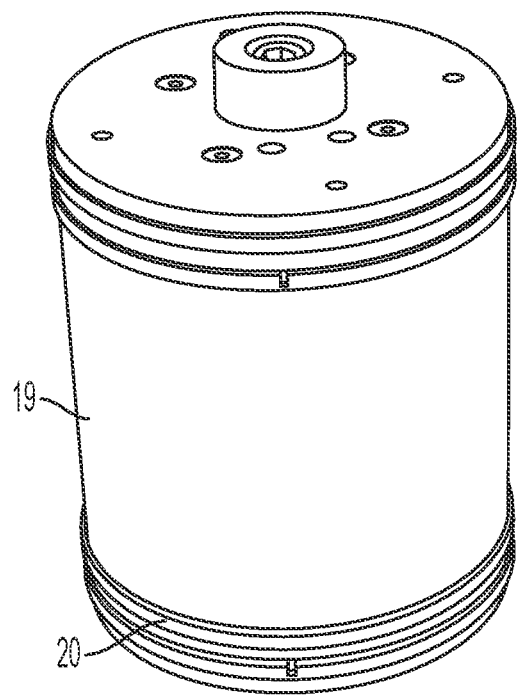
FIG. 8b is an isometric view of the piston according to an embodiment of the present technology.

In preferred embodiments, the piston 2 has a set of three rings of permanent neodymium magnets 5, each having a strength of 1.32 T, a length L of 20 mm, an inner diameter $d_i$ of 80 mm, and an outer diameter $d_o$ of 120 mm. The magnetization of the rings is oriented along the longitudinal axis 7 of the pump body 3, but with alternating direction, as described above. In some embodiments, the magnets 5 are supported by a custom non-magnetic aluminum support structure that maintains a 10 mm gap between each ring magnet. Piston 2 is preferably contained in stainless steel cylinder 19 having a length of 155 mm and outer diameter of 125 mm, which is hermetically sealed via laser welding to ensure no contact between the fluid and the magnets 5, as shown in FIG. 8b. Cylinder 19 has a longitudinal axis that is preferably aligned with the longitudinal axis 7 of the pump body 3. In some embodiments, the cylinder 19 is sealed against the interior wall of the pump body 3 with ultra-high molecular weight polyethylene ("UHMWPE") gaskets 20 that are connected with stainless steel mounts. Thus, all internal components that come into contact with the fluid consist solely of vacuum compatible materials, which minimize contamination via outgassing and Rn emanation. In some embodiments, surface treatment, such as electro polishing, is employed to further reduce Rn emanation from materials.

In some embodiments, the gasket design differs to create a larger sealing contact between the piston 2 and the interior wall of the pump body 3. The gasket design in these embodiments is optimized to minimize the dead volume between the end cap of the pump body 3 and the end of the piston 2, thus accomplishing a more complete exhaust of fluid in each stroke. This improves performance and reduces adiabatic heating of fluid that remains inside the pump body 3.

In some embodiments, the fluid used in pump 1 is a gas. Preferably, the gas is a pure noble gas, such as argon or xenon. Because the gaskets 20 are directly in contact with the pure noble gas, the gasket material must have low rates of outgassing, Rn emanation, and physical wear. UHMWPE has been shown to perform adequately in these regards, and thus is used in preferred embodiments. By utilizing a vertical orientation of the pump body 3, a more symmetrical alignment of the piston 2 is achieved, which further reduces wear rate.

Preferably, the piston 2 is magnetically coupled to a set of drive ring magnets 6 located outside the pump body 3. In some embodiments, each of the drive ring magnets 6 are constructed of a plurality of permanent neodymium bar magnets 21, each having a strength of 1.38 T measuring 20 mm×10 mm×20 mm in a cylindrical arrangement, with the 10 mm dimension tangent to the circumference. In some embodiments, the drive ring magnets 6 are supported by a custom nonmagnetic aluminum frame 22, as shown in FIGS. 9a-9b. The frame 22 holds the drive magnets 6 in equal and opposite magnetization orientation to the corresponding piston magnets 5, again preferably along the longitudinal axis 7 of the pump body 3, with the same 10 mm spacing s between adjacent magnets 5/6. In some embodiments, the inner diameter $D_i$ of the drive unit frame 22 is 137 mm, resulting in an 8.5 mm radial gap between the piston magnets 5 and the drive magnets 6. In some embodiments, the 8.5 mm gap is measured transverse to the longitudinal axis 7 of the pump body 3.

In preferred embodiments, the piston 2 and drive unit 4 have three pairs of corresponding ring magnets 5/6 configured to yield a maximum coupling force of about 3500N. This coupling strength corresponds to a pressure difference of about 2.7 bar across the piston 2. Thus, in some embodiments, magnets 5/6 yield a maximum coupling force in the range of about 790N to about 3500N.

Preferably, the pump 1 is mounted vertically. In some embodiments, the drive unit 4 is driven with a linear drive composed of an electric cylinder (SEW, CMS) that is powered by a frequency converter (SEW, MDX 61B). In some embodiments, the converter uses a Modbus connection, allowing operation via an external slow control environment.

Figure 10A:
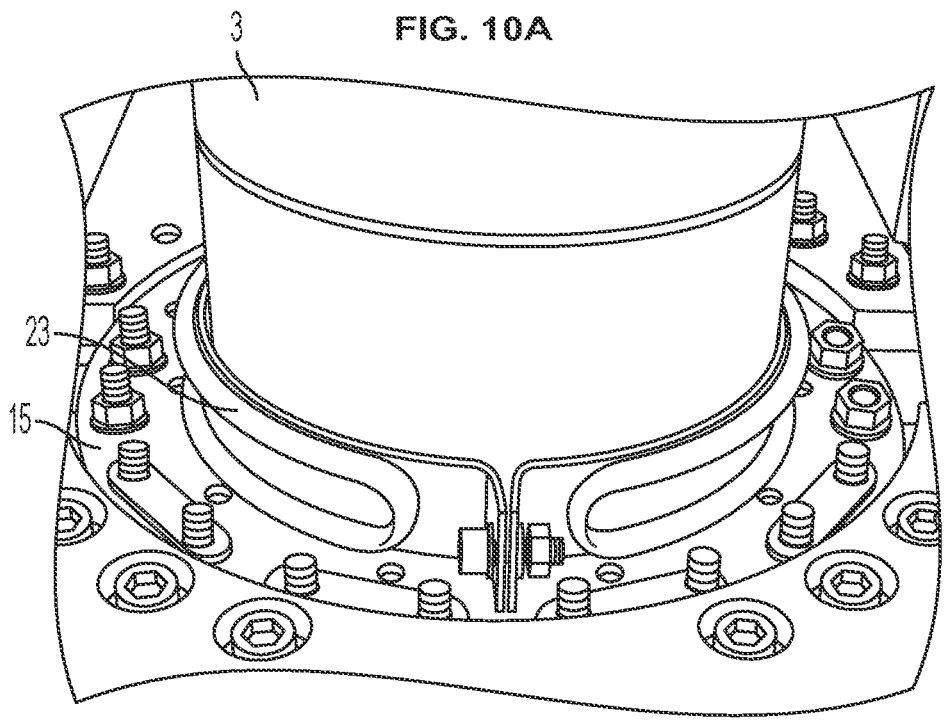
FIG. 10a is an isometric view of a water cooling system for the pump according to an embodiment of the present technology.
Figure 10B:
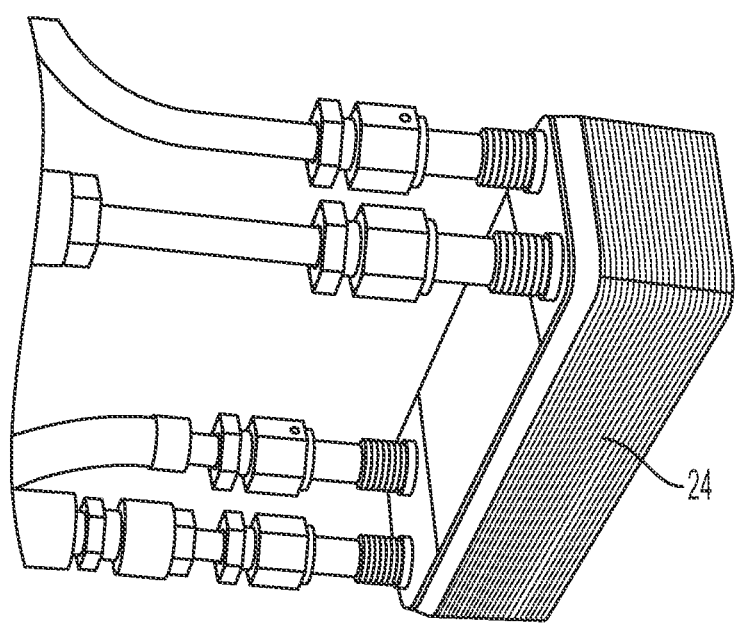
FIG. 10b is an isometric view of a heat exchanger for the pump according to an embodiment of the present technology.

In some embodiments, the pump 1 also includes a cooling system to avoid demagnetization of the neodymium magnets 5/6 at critical temperatures higher than 70° C. during continuous operation. As shown in FIG. 10a, copper shells 23 are attached to the end caps of the pump body 3. Copper shells 23 are preferably flushed with cold water to cool the space of highest compression directly between the flanges 15 and the ends of pump body 3. In some embodiments, the cooling system includes a counter-flow heat exchanger 24 to pre-cool the fluid with the same cooling water before the fluid enters the pump 1, as shown in FIG. 10b.

Figure 11:
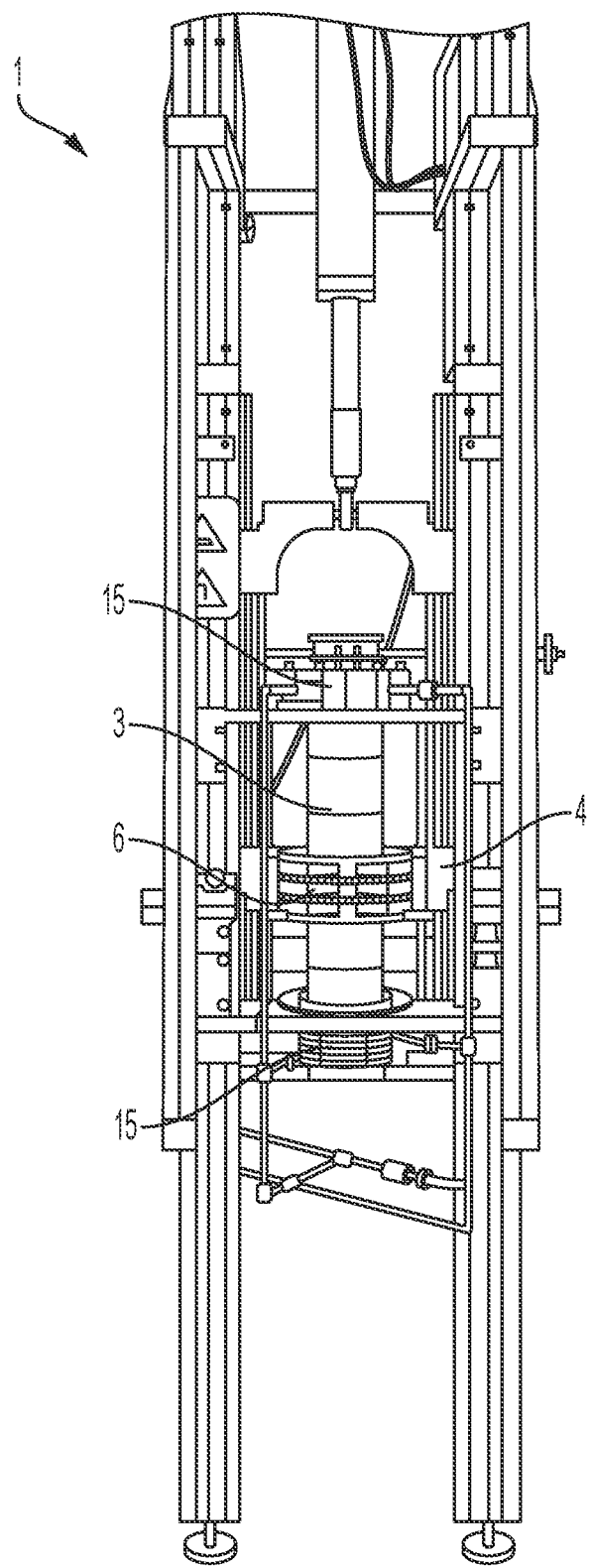
FIG. 11 is an isometric view of the fully-assembled pump according to an embodiment of the present technology.
Figure 12:
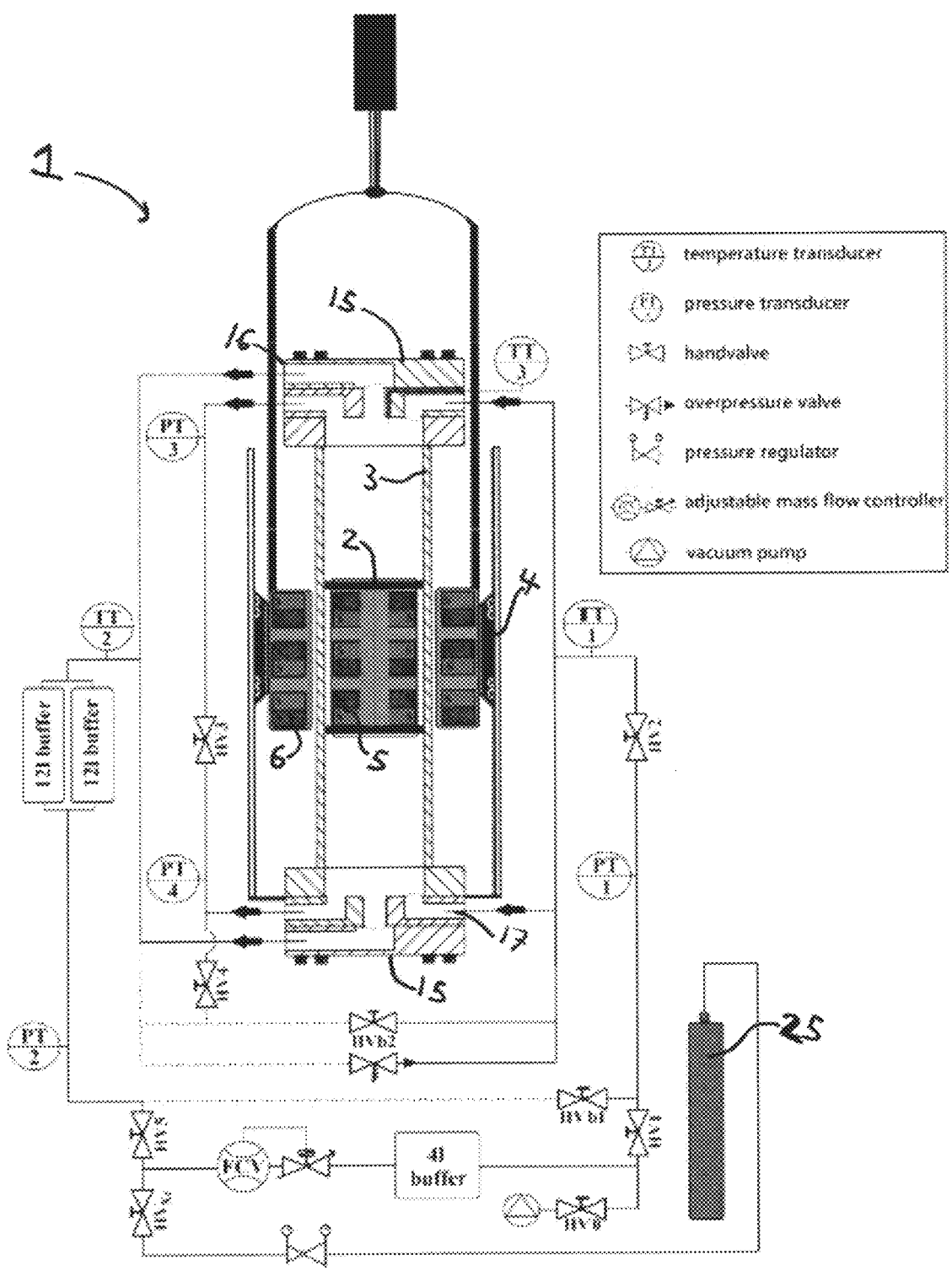
FIG. 12 is a schematic view of the pump of FIG. 11.

FIG. 11 shows an isometric view of the fully-assembled pump 1 according to an exemplary embodiment. FIG. 12 shows a schematic view of the performance of the pump 1 of FIG. 11. The arrows indicate the unidirectional flow through the flapper valves 17 of flanges 15. Preferably, the entire system is evacuated to high vacuum with a scroll pump and turbomolecular pump to the level of $10^{-7}$ mbar. In some embodiments, a gas such as xenon or argon is then introduced to the system by a gas bottle 25 with a pressure regulator to allow different pressures in the system, and the gas can be recovered to the bottle via cryopumping by cooling the bottle with liquid nitrogen. The testing circuit includes a mass flow controller (FCV, MKS, 1579A) to measure gas flow up to 211 slpm for argon and 200 slpm for xenon. Two buffer volumes of 12 l and one of 4 l are added to reduce flow oscillations due to the small volume of the gas system relative to that of the pump 1. In some embodiments, three temperature transducers (TT, Farnell, HEL-705) and four pressure transducers (PT, Swagelok, PTU) are mounted.

In some embodiments, temperatures are monitored by three PT1000 temperature sensors in combination with an internal temperature sensor of the linear drive. Preferably, TT1 is installed at the gas inlet, TT2 is installed at the gas outlet, and TT3 is installed inside the pump body 3 just below the top flange 15. TT3 is important because it is mounted at the point of highest fluid compression, and thus, at the point of highest temperature.

In some embodiments, pressure sensors PT1 and PT2 measure the pressures before and after the pump body 3. The differential pressure across the pump 1 is then defined as $\Delta P_{pump}$=PT2−PT1 and measures the pressure difference between the inlet and outlet of the flanges 15. In some embodiments, PT3 and PT4 are located next to the compression volumes of the pump body 3 and can therefore measure pressure differential across the piston 2 as $\Delta P_{piston}$=PT3−PT4, or the pressure above the top of the piston 2 minus the pressure below the bottom of the piston 2. With this definition, a positive $\Delta P_{piston}$ corresponds to an upward stroke, while negative values correspond to a downward stroke. Handvalve HV3 is preferably closed during normal operation to isolate the two ends of the pump body 3, and is only opened for cleaning under vacuum.

In some embodiments, during standard operation, if $\Delta P_{piston}$ exceeds the critical decoupling pressure of $\Delta P_{crit}$=2.7 bar, when force of the fluid against the piston 2 plus the friction of the gaskets 20 against the interior wall of the pump body 3 is greater than the magnetic coupling force, the piston 2 will decouple from the drive unit 4. As shown in FIG. 7, there are two stable equilibrium points, where the restoring force is zero and the slope is positive. This indicates that upon decoupling, the piston 2 will lag the drive unit 4 by about 60 mm. This is not inherently a problem, since the piston will restore to alignment at the end of the corresponding return stroke. Nevertheless, this is avoided by preferably operating the pump 1 below decoupling pressure. In some embodiments, a safety margin is used to account for the friction, and $\Delta P_{piston}$ is kept below 2.2 bar.

Figure 13:
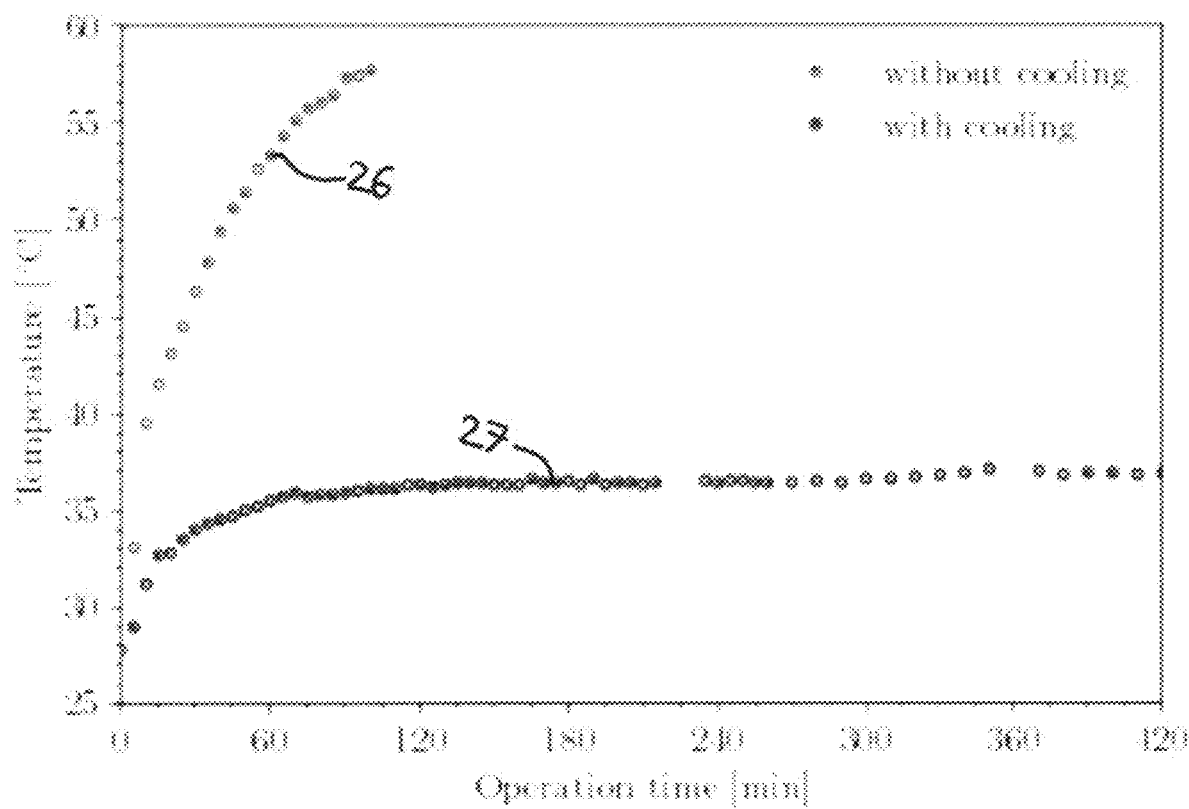
FIG. 13 is a chart showing the internal temperature of the pump as a function of operation time for an embodiment using argon as the fluid.

In some embodiments, tests were performed to monitor the temperature evolution during operation using argon at an inlet pressure of (1.45+/−0.05) bar, a flow of (103+/−4) slpm, and a $\Delta P_{pump}$ of (0.76+/−0.05) bar. FIG. 13 shows the heat evolution inside the pump 1 for the argon tests at TT3 without and with the cooling system. The results of the test without the cooling system are indicated by plotting 26, and the results of the test with the cooling system are indicated by plotting 27. Due to the temperature exceeding 50° C. without the cooling system, the pump 1 could not be operated stably, and the test was stopped to avoid overheating the magnets 5/6. However the operation of the cooling system adequately reduced the temperature inside the pump 1 in this embodiment to around 35° C. for long-term operation. This was tested with a prototype drive magnet 6 with lower field strength, but was still sufficient to demonstrate the functionality of the cooling system. This is verified by the long-term stability tests discussed below.

Figure 14:
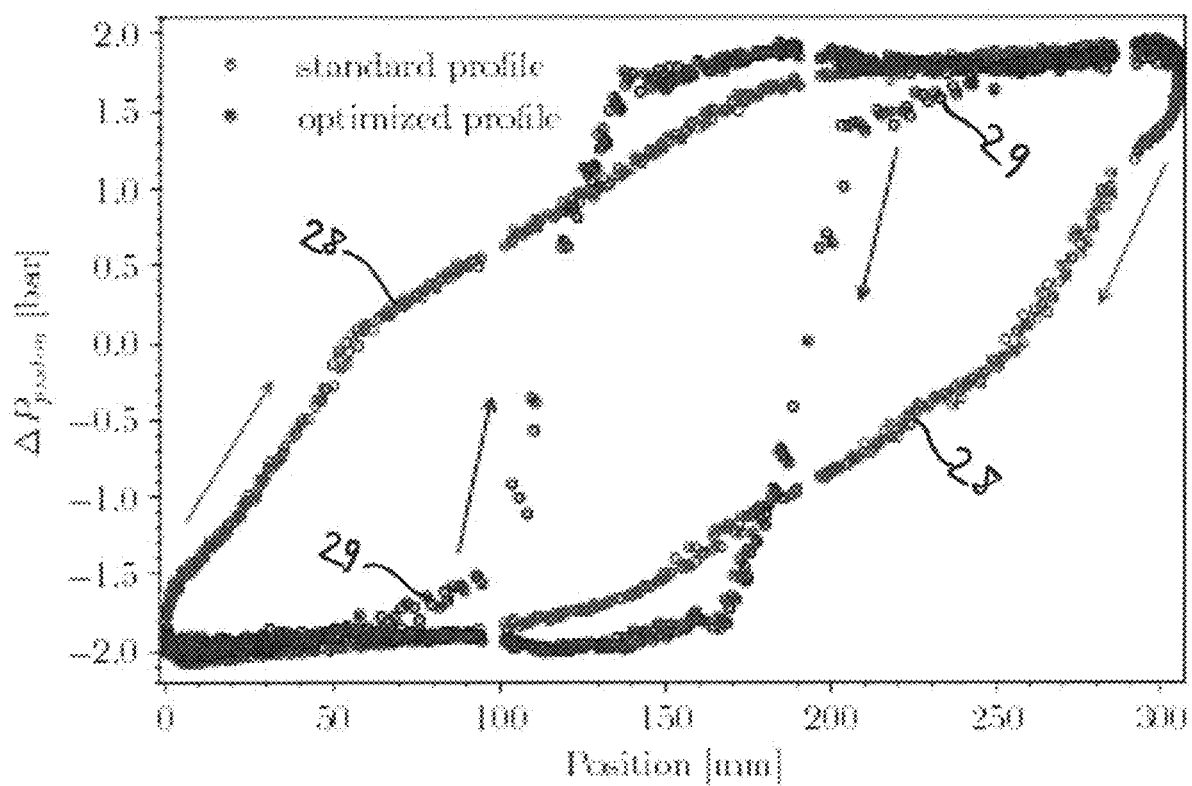
FIG. 14 is a chart showing the piston pressure as a function of the position of the outer ring of the pump for an embodiment using xenon as the fluid.

In some embodiments, maintain a constant $\Delta P_{piston}$ is non-trivial, due to the fact that the pressure rises slowly over the piston stroke. A linear driving profile (standard profile) that drives the piston 2 at a constant speed over the stroke is inefficient as the maximum $\Delta P_{piston}$ is reached very late in the stroke. This was demonstrated using xenon gas at an inlet pressure of (1.8+/−0.1) bar and measuring the maximum flow and pressure differential, as shown in FIG. 14. The monotonically increasing pressure over each stroke yields a non-uniform pressure, as indicated by plotting 28. In some embodiments, an optimized profile was implemented that quickly compresses the gas upon turnaround of the piston 2 by moving it as high speeds until reaching the operating pressure. The profile then holds the pressure constant over the remainder of the stroke by moving at a slower, constant speed. Plotting 29 of FIG. 14 demonstrates this more uniform pressure differential. The arrows of FIG. 14 indicate the movement of the piston 2 during a full stroke up and down.

Figure 15:
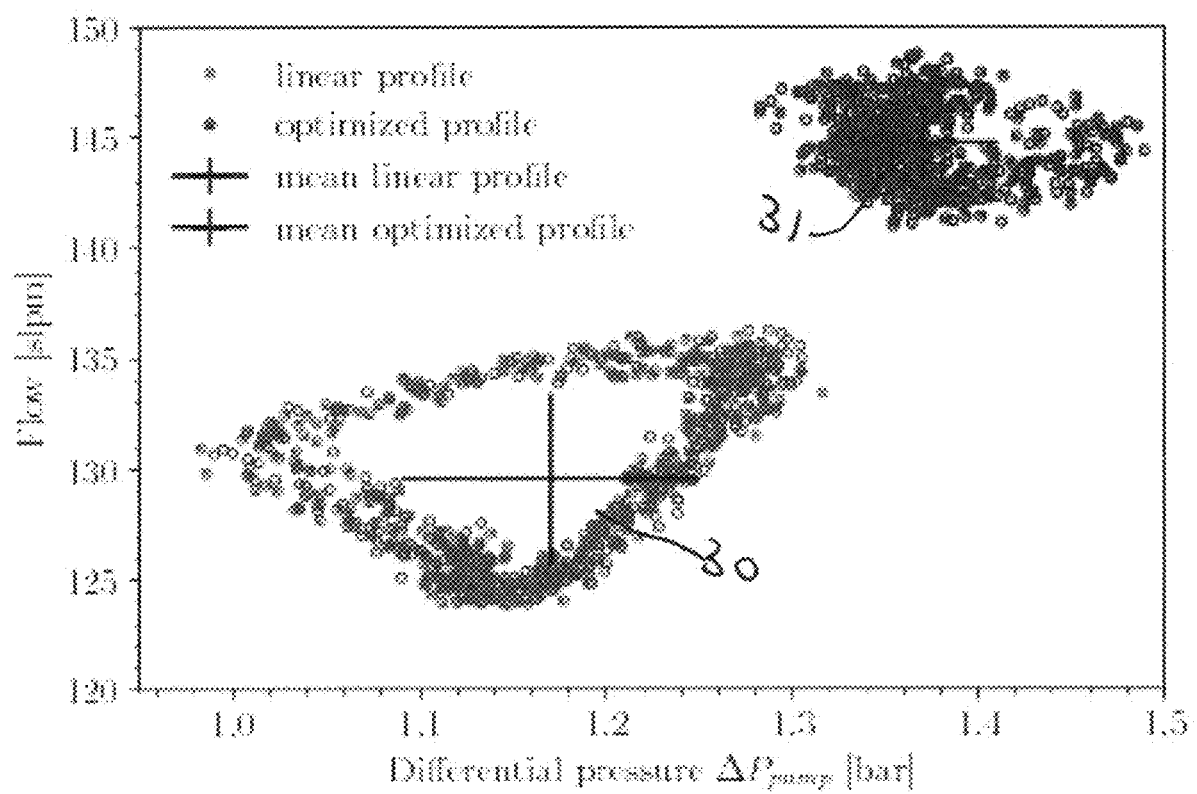
FIG. 15 is a chart showing the fluid flow as a function of differential pressure of the pump at a mean inlet pressure for an embodiment using xenon as the fluid.

In some embodiments, further improvement via profile optimization is shown in FIG. 15, which shows the flow vs. $\Delta P_{piston}$ for the two driving profiles used. The performance improvement is seen both in the absolute flow and $\Delta P_{pump}$, and also results in a tighter distribution over the pump motion. With the standard linear profile 30, a mean flow of (129+/−4) slpm and a compression of $\Delta P_{pump}$=(1.17+/−0.08) bar was achieved in contrast to the mean of the optimized profile 31 with a flow of (144+/−2) slpm and a $\Delta P_{pump}$ of (1.37+/−0.04) bar. As a uniform pressure and flow are usually the most important parameters for stability of liquid noble detectors, this optimization is important to the performance of the pump 1 in this embodiment.

Figure 16:
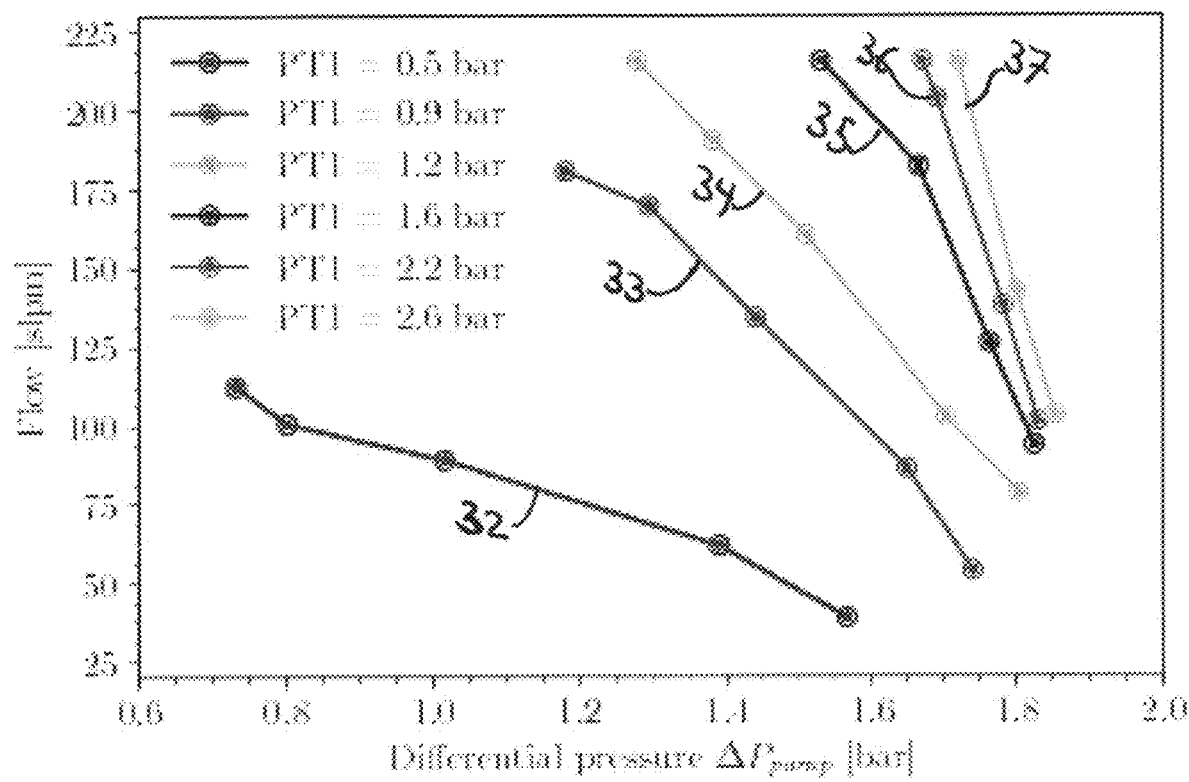
FIG. 16 is a chart showing the performance of the pump for different inlet pressures for an embodiment using argon as the fluid.
Figure 17:
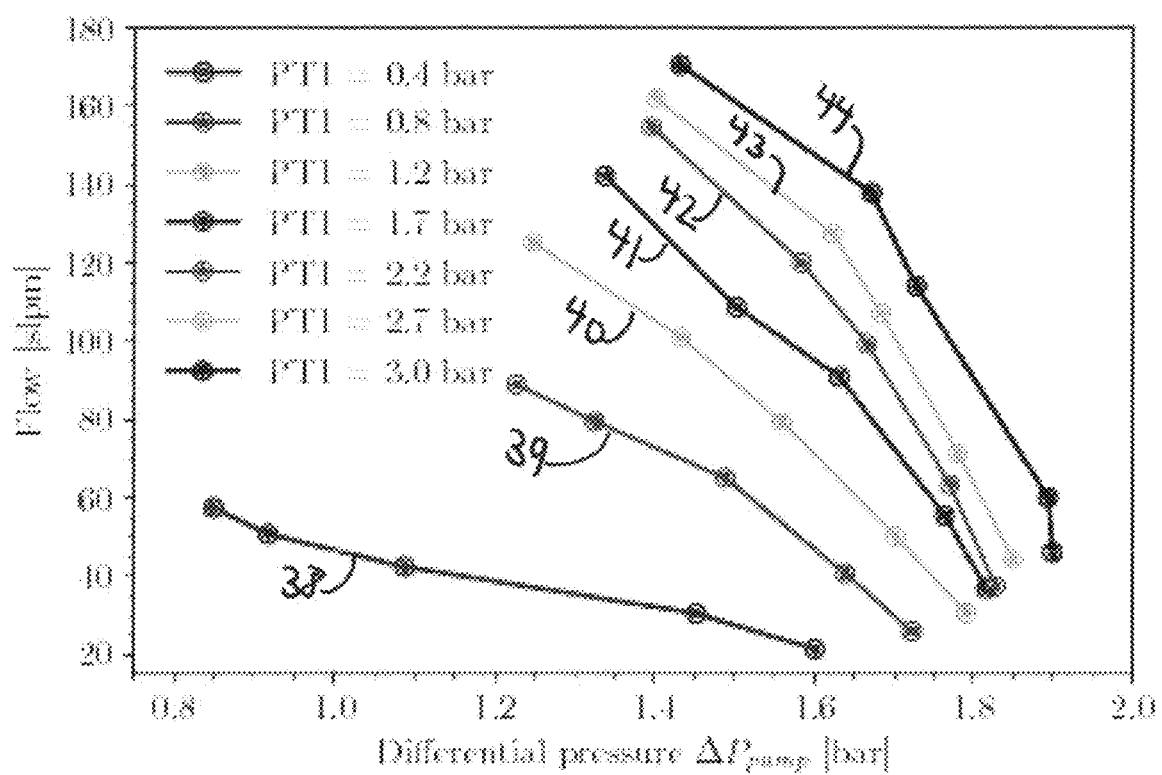
FIG. 17 is a chart showing the performance of the pump for different inlet pressures for an embodiment using xenon as the fluid.

In some embodiments, to characterize the performance of the pump 1 quantitatively, measurements of flow vs. differential pressure were made using both xenon and argon at different inlet pressures. In some embodiments, the inlet pressure can be controlled by closing handvalve HV2 within the recirculation circuit stepwise, by varying the amount of the gas in the system, or by changing the linear drive velocity. Thereby, the pump performance can be tested for a wide operation range. Tests were made at a constant pump inlet pressure, as measured by PT1. For all measurements, the pump was operated at maximum $\Delta P_{piston}$, which is the condition of maximal flow. Multiple measurements were then made of the flow and $\Delta P_{pump}$. The results of the flow and $\Delta P_{pump}$ are averaged over several strokes of the pump, and are shown for argon in FIG. 16 and for xenon in FIG. 17. The performance was measured for up to seven different inlet pressures at up to five handvalve positions for each inlet pressure. Plottings 32-37 of FIG. 16 represent inlet pressures of argon of 0.5 bar, 0.9 bar, 1.2 bar, 1.6 bar, 2.2 bar, and 2.6 bar, respectively. Plottings 38-44 of FIG. 17 represent inlet pressures of xenon of 0.4 bar, 0.8 bar, 1.2 bar, 1.7 bar, 2.2 bar, 2.7 bar, and 3.0 bar, respectively.

For argon, flows exceeded the capacity of the mass flow controller, which has a maximum flow for argon of 211 slpm. This was achieved for several inlet pressures ranging from 1.2 bar to 2.6 bar. In particular, at a 2.6 bar inlet pressure, a maximum differential pressure of $\Delta P_{pump}=1.85$ bar was reached at a flow of 95 slpm. At the maximum flow allowed by the mass flow controller of 211 slpm, a differential pressure of 1.72 bar was obtained for the same inlet pressure. For xenon, a maximum flow of 171 slpm was achieved with a $\Delta P_{pump}$ of 1.45 bar at an inlet pressure of 3.0 bar. The maximum differential pressure of $\Delta P_{pump}=1.9$ bar was reached with a flow of 45 slpm at the same inlet pressure of 3.0 bar.

In some embodiments, the steep flow vs $\Delta P_{pump}$ curves for argon and xenon at high inlet pressure show that the pump 1 works essentially as a pressure amplifier in this performance regime, with the flow largely dominated by the impedance of the circuit. This is consistent with the fact that the pumping mechanism is effectively adiabatic compression, with the subsequent motion of the gas being passive flow through the impeding circuit. This feature is more extreme in the argon data. This, coupled with the lower flow rates of xenon compared to argon, is indicative of the increased difficulty of pumping a heavy gas like xenon. Due to this, performance with lighter gases like neon is expected to be even better than for argon.

In some embodiments, the relatively flat curves for both argon and xenon at low inlet pressure indicate a different performance regime. At inlet pressures below 1.2 bar for argon and 0.8 bar for xenon, the limited power of the linear drive was insufficient to drive the piston 2 fast enough to reach maximum $\Delta P_{piston}$, resulting in a characteristically different flow to pressure relationship.

Figure 18:
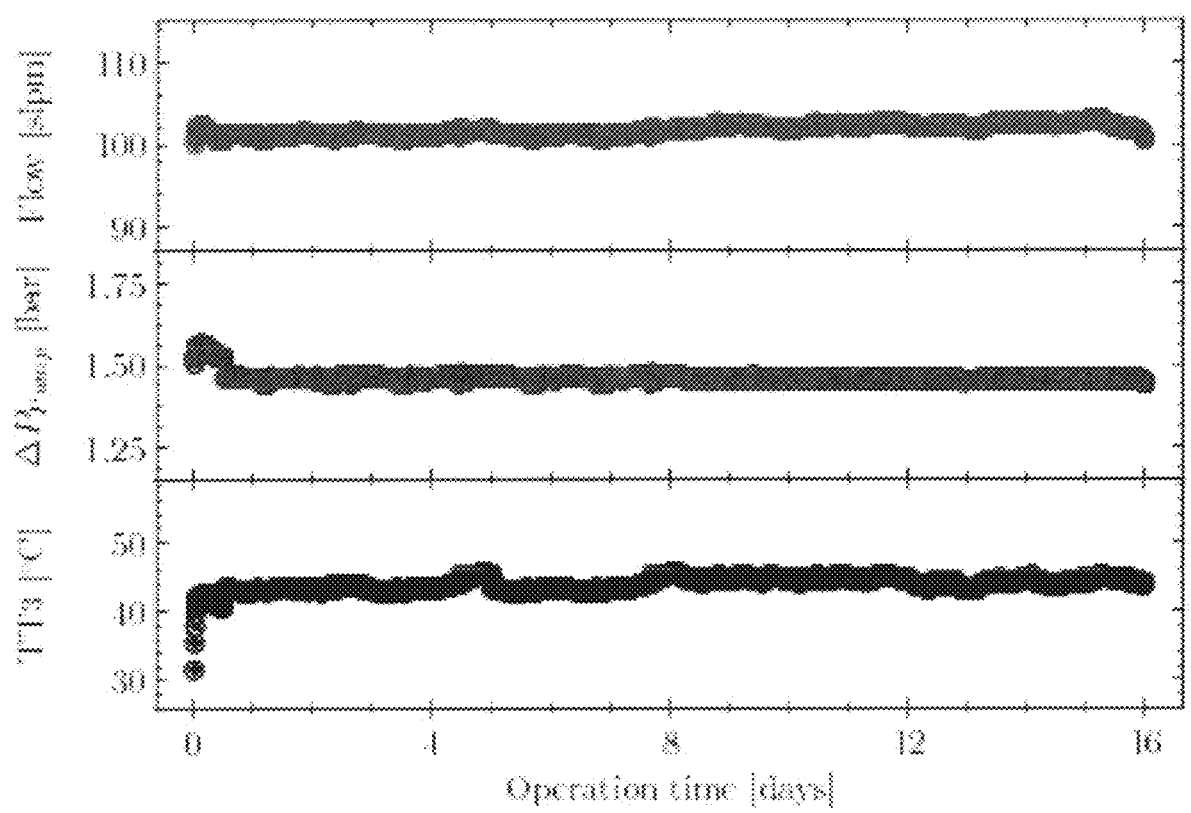
FIG. 18 is a chart showing the long-term stability of the pump according to an embodiment using xenon as the fluid at a constant inlet pressure.

In some embodiments, performance improves with higher inlet pressures. The anti-correlation between flow and $\Delta P_{pump}$ in other embodiments of this pump. Embodiments requiring a large pressure differential often include lower flow requirements, and those with high flow requirements often include low impedance circuits. Another important pump characteristic is long term stability with high performance, as this is required for many embodiments. To this end, a study of the stability in a high performance state was performed using xenon. FIG. 18 shows the stability of performance parameters such as flow, $\Delta P_{pump}$, and temperature TT3 inside the pump body 3 just below the top flange 15. A stable operation of the embodiment illustrated with an average flow of (100±2) slpm and a mean differential pressure of (1.42±0.04) bar has been achieved over a period of 16 days. A stable temperature inside the body of (43±1°) C. has also been obtained, which is well below the demagnetization temperature for the magnets. Thus, the performance of the cooling system is verified for the magnet configuration in preferred embodiments, as well as over a two week long operation.

For some embodiments, such as for use in rare event experiments, the radon emanation of pumps is of crucial importance. To assess this aspect of the pump 1, a measurement was performed to determine the emanation rate of 222 Rn from the interior of the fully-assembled pump 1. A gas sample was extracted and measured following the method in G. Zuzel and H. Simgen, *High sensitivity radon emanation measurements*, Applied Radiation and Isotopes 67 (2009) (5), pp. 889-893, resulting in an emanation rate of (330±60) µBq, an order of magnitude cleaner than what has been achieved in commercial pumps. This meets the current radiopurity needs for low background environments. In other embodiments where further Rn reduction is necessary, surface treatments to minimize the surface area and Rn emanation are implemented.

Thus, some embodiments of the present technology relate to pump designs with a magnetically-coupled drive mechanism based on an alternating magnet configuration. Embodiments of the technology have particular use in noble gas applications. The complete isolation of the drive from the gas and the usage of only clean components in some embodiments yields a high purity, with a $^{222}$Rn emanation rate of (330±60) µBq. A stable performance of more than 210 slpm for argon and more than 170 slpm for xenon combined with a compression up to 1.9 bar makes the pump according to an exemplary embodiment a promising tool for many noble gas and high purity applications.

Although the technology has been described and illustrated with respect to exemplary embodiments thereof, it should be understood by those skilled in the art that the foregoing and various other changes, omissions, and additions may be made therein and thereto, without parting from the spirit and scope of the present technology.

What is claimed is:

1. A magnetically coupled piston pump, comprising:
a pump body having a longitudinal axis;
a piston disposed in the pump body and configured to move within the pump body in a direction parallel to the longitudinal axis, the piston comprising a set of piston magnets, wherein each piston magnet has poles arranged parallel to the longitudinal axis and wherein each piston magnet is arranged in the piston so that the orientation of the poles of each piston magnet is the opposite of the orientation of each adjacent piston magnet;
a set of drive magnets arranged outside the pump body, wherein each drive magnet corresponds to a piston magnet and wherein each drive magnet has poles arranged parallel to the longitudinal axis and each drive magnet is arranged so that the orientation of the poles is opposite the orientation of the poles of the piston magnet to which it corresponds; and
a cooling system for regulating the temperature within the pump, the cooling system comprising:
at least one copper shell attached to each of a first end of the pump body and a second end of the pump body, the at least one copper shell having cold water therein to cool high-compression spaces within the pump body at the first end of the pump body and the second end of the pump body; and
a counter-flow heat exchanger configured to pre-cool a fluid with cold water before the fluid enters the pump body.

2. The pump of claim 1, further comprising a drive unit coupled to the drive magnets for moving the drive magnets in a direction parallel to the longitudinal axis.

3. The pump of claim 1, further comprising a first flange attached to the first end of the pump body, and a second flange attached to the second end of the pump body, the first and second flanges each having inlet and outlet ports such that the fluid can enter and exit the pump body.

4. The pump of claim 3, wherein the fluid is argon gas.

5. The pump of claim 3, wherein the fluid is xenon gas.

6. The pump of claim 2, wherein the set of piston magnets comprises at least two permanent magnets and the set of drive magnets comprises at least two permanent magnets.

7. The pump of claim 2, wherein the set of piston magnets comprises three permanent magnets and the set of drive magnets comprises three permanent magnets.

8. The pump of claim 2, wherein the piston and drive magnets are ring magnets.

9. The pump of claim 2, wherein each drive magnet of the set of drive magnets comprises a plurality of bar magnets attached to a frame and arranged in a cylindrical configuration.

10. The pump of claim 1, wherein the pump body is hermetically sealed and the piston is sealed against an interior wall of the pump body with a plurality of gaskets formed of ultra-high molecular weight polyethylene.

11. The pump of claim 1, wherein the piston magnets and the drive magnets are configured to have a coupling strength of about 790N to about 3500N.

12. The pump of claim 7, wherein the piston magnets and the drive magnets are configured to have a coupling strength of about 3500N.

13. The pump of claim 1, wherein adjacent magnets of the set of piston magnets and the set of drive magnets are evenly spaced along the longitudinal axis.

14. The pump of claim 8, wherein the set of piston magnets and the set of drive magnets have about 10 mm spacing between adjacent magnets along the longitudinal axis.

15. The pump of claim 1, further comprising a gap of about 8.5 mm transverse to the longitudinal axis between the set of piston magnets and the set of drive magnets.

16. A magnetically coupled drive mechanism, comprising:
a piston, comprising at least three piston magnets disposed in a cylindrical frame having a longitudinal axis, wherein each piston magnet has poles arranged parallel to the longitudinal axis and wherein each piston magnet is arranged in the piston so that the orientation of the poles of each piston magnet is the opposite of the orientation of each adjacent piston magnet;
at least three drive magnets arranged outside the piston, wherein each drive magnet corresponds to a piston magnet and wherein each drive magnet has poles arranged parallel to the longitudinal axis and each drive magnet is arranged so that the orientation of the poles is opposite the orientation of the poles of the corresponding piston magnet; and
a drive unit coupled to the drive magnets for moving the drive magnets in a direction parallel to the longitudinal axis;
the piston is configured to be disposed in and permitted to move within a cylindrical pump body in a direction parallel to the longitudinal axis, and the drive unit and drive magnets arranged outside the cylindrical pump body, the cylindrical pump body having a first end, a second end, and a cooling system, the cooling system comprising:
at least one copper shell attached to each of the first end of the cylindrical pump body and the second end of the cylindrical pump body, the at least one copper shell having cold water therein to cool high-compression spaces within the cylindrical pump body at the first end of the cylindrical pump body and the second end of the cylindrical pump body; and
a counter-flow heat exchanger configured to pre-cool a fluid with cold water before the fluid enters the cylindrical pump body.

17. The drive mechanism of claim 16, wherein the piston and drive magnets are ring magnets.

18. The drive mechanism of claim 16, wherein each of the drive magnets comprises a plurality of bar magnets attached to a frame and arranged in a cylindrical configuration.

* * * * *